United States Patent
Yu

(10) Patent No.: US 10,135,342 B1
(45) Date of Patent: Nov. 20, 2018

(54) DC-TO-DC CONVERTER AND POWER ALLOCATION METHOD THEREOF

(71) Applicant: ACTRON TECHNOLOGY CORPORATION, Taoyuan (TW)

(72) Inventor: Chia-Sung Yu, Taoyuan (TW)

(73) Assignee: ACTRON TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 15/815,724

(22) Filed: Nov. 17, 2017

(30) Foreign Application Priority Data

Sep. 19, 2017 (TW) .............................. 106132057 A

(51) Int. Cl.
*H02M 3/158* (2006.01)
*H02M 3/16* (2006.01)
*H02M 1/00* (2006.01)

(52) U.S. Cl.
CPC ...... *H02M 3/16* (2013.01); *H02M 2001/0058* (2013.01)

(58) Field of Classification Search
CPC ........ H02M 1/32; H02M 3/156; H02M 3/152; H02M 3/158; H02M 3/1588
See application file for complete search history.

(56) References Cited

U.S. PATENT DOCUMENTS

| 9,543,839 B2* | 1/2017 | Jin ........................ H02M 3/158 |
| 2003/0111982 A1* | 6/2003 | Watanabe ............. H02M 3/158 323/225 |

* cited by examiner

*Primary Examiner* — Gary L Laxton
(74) *Attorney, Agent, or Firm* — JCIPRNET

(57) ABSTRACT

A DC-to-DC converter and a power allocation method thereof are provided. The DC-to-DC converter includes a switching circuit and a power allocation circuit. The switching circuit is coupled to a DC power source to receive a DC input voltage and controlled by a first control signal to generate a pulse voltage. The power allocation circuit is coupled to the switching circuit to receive the pulse voltage and store an electrical energy. The power allocation circuit is further coupled to the DC power source. The power allocation circuit is controlled by a second control signal to convert the electrical energy into a DC output voltage and provides the DC output voltage to a load, or the power allocation circuit is controlled by the second control signal to recuperate the electrical energy to the DC power source.

18 Claims, 7 Drawing Sheets

DC-TO-DC CONVERTER AND POWER ALLOCATION METHOD THEREOF

CROSS-REFERENCE TO RELATED APPLICATION

This application claims the priority benefit of Taiwan application serial no. 106132057, filed on Sep. 19, 2017. The entirety of the above-mentioned patent application is hereby incorporated by reference herein and made a part of this specification.

TECHNICAL FIELD

The invention is related to a power converter, and particularly to a DC-to-DC converter having a power allocation mechanism and a power allocation method thereof.

DESCRIPTION OF RELATED ART

In existing DC-to-DC converters, when a load of an output end of the DC-to-DC converter is dramatically changed or the load of the DC-to-DC converter is removed, generally the energy stored in the DC-to-DC converter cannot be discharged, causing the output voltage of the DC-to-DC converter to have a surge phenomenon. The surged output voltage is very likely to cause damage to the element in the DC-to-DC converter or the other load of the output end.

SUMMARY OF INVENTION

Accordingly, the invention provides a DC-to-DC converter and a power allocation method, which can suppress a surge phenomenon of a DC output voltage of the DC-to-DC converter when the load of the DC-to-DC converter is changed or removed.

In the invention, the DC-to-DC converter is coupled between a DC power source and a load. The DC-to-DC converter includes a first switching circuit and a power allocation circuit. The first switching circuit is coupled to the DC power source to receive a DC input voltage and controlled by a first control signal to generate a pulse voltage. The energy allocation circuit is coupled to the DC power source and the first switching circuit to receive the pulse voltage and store electrical energy accordingly. The power allocation circuit is controlled by a second control signal to convert the electrical energy into a DC output voltage to be provided to the load, or controlled by the second control signal to recuperate the electrical energy to the DC power source.

In an embodiment of the invention, the DC-to-DC converter further includes a control circuit. The control circuit is coupled to the first switching circuit and the power allocation circuit to detect the DC output voltage. When the DC output voltage is greater than a first threshold voltage, the control circuit generates the first control signal to turn off the first switching circuit, and generates the second control signal to turn off a power transmitting path between the power allocation circuit and the load so as to stop converting the electrical energy into the DC output voltage and to recuperate the electrical energy to the DC power source, thereby suppressing the DC output voltage to be lower than or equal to the first threshold voltage.

In an embodiment of the invention, when the DC output voltage is lower than or equal to the first threshold voltage but greater than a second threshold voltage, the control circuit generates the first control signal to turn off the first switching circuit, and the control circuit generates the second control signal to control on and off of the power transmitting path between the power allocation circuit and the load so as to convert the electrical energy into the DC output voltage or recuperate the electrical energy to the DC power source. When the DC output voltage is lower than or equal to the second threshold voltage, the control circuit generates the first control signal to control on and off of the first switching circuit, and the control circuit generates the second control signal to turn on the power transmitting path between the power allocation circuit and the load so as to stop recuperating the electrical energy to the DC power source and to convert the electrical energy into the DC output voltage.

In an embodiment of the invention, the first switching circuit is a hard switching circuit or a resonant soft switching circuit or a quasi resonant soft switching circuit.

In an embodiment of the invention, the DC-to-DC converter further includes a second switching circuit and a control circuit. The second switching circuit is coupled to the power allocation circuit and controlled by a third control signal to boost the DC output voltage such that the DC output voltage is greater than the DC input voltage. The control circuit is coupled to the first switching circuit, the power allocation circuit and the second switching circuit for detecting the DC output voltage. When the DC output voltage is greater than the first threshold voltage, the control circuit generates the first control signal to turn off the first switching circuit, the control circuit generates the third control signal to turn off the second switching circuit, and the control circuit generates the second control signal to turn on a power recuperating path between the power allocation circuit and the DC power source so as to stop converting the electrical energy into the DC output voltage and to recuperate the electrical energy to the DC power source, thereby suppressing the DC output voltage to be lower than or equal to the first threshold voltage.

In an embodiment of the invention, when the DC output voltage is lower than or equal to the first threshold voltage but greater than the second threshold voltage, the control circuit generates the first control signal to turn off the first switching circuit, the control circuit generates the third control signal to turn off the second switching circuit, and the control circuit generates the second control signal to control on and off of the power allocation circuit so as to convert the electrical energy into the DC output voltage or recuperate the electrical energy to the DC power source. When the DC output voltage is lower than or equal to the second threshold voltage, the control circuit generates the first control signal to turn on the first switching circuit, the control circuit generates the second control signal to turn off the power recuperating path between the power allocation circuit and the DC power sources, and the control circuit generates the third control signal to control on and off of the second switching circuit so as to stop recuperating the electrical energy to the DC power source and to convert the electrical energy into the DC output voltage, such that the DC output voltage is maintained at the second threshold voltage.

In the invention, the power allocation method may be applied to the DC-to-DC converter. The power allocation method includes the following steps. A DC input voltage of a DC power source is received by a first switching circuit of the DC-to-DC converter, and a pulse voltage is generated by the first switching circuit in response to a first control signal. The pulse voltage is received by a power allocation circuit of the DC-to-DC converter such that electrical energy is stored. The stored electrical energy is converted into a DC output voltage to be provided to a load by the power allocation circuit in response to a second control signal, or the stored electrical energy is recuperated to the DC power source by the power allocation circuit in response to the second control signal.

In summary, the DC-to-DC converter and the power allocation method thereof in the embodiment of the invention can activate the electrical energy recuperating mechanism when the load is changed or removed, such that the stored electrical energy could be recuperated to the DC power source. In this manner, the voltage value of the DC output voltage can be suppressed effectively so as to avoid that the over-high DC output voltage causes damage to the element inside the DC-to-DC converter or the load. In addition, the DC-to-DC converter in the embodiment of the invention further has the advantage of zero-current switching or zero-voltage switching, which can effectively reduce switching loss to improve overall converting efficiency while reducing electromagnetic interference.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
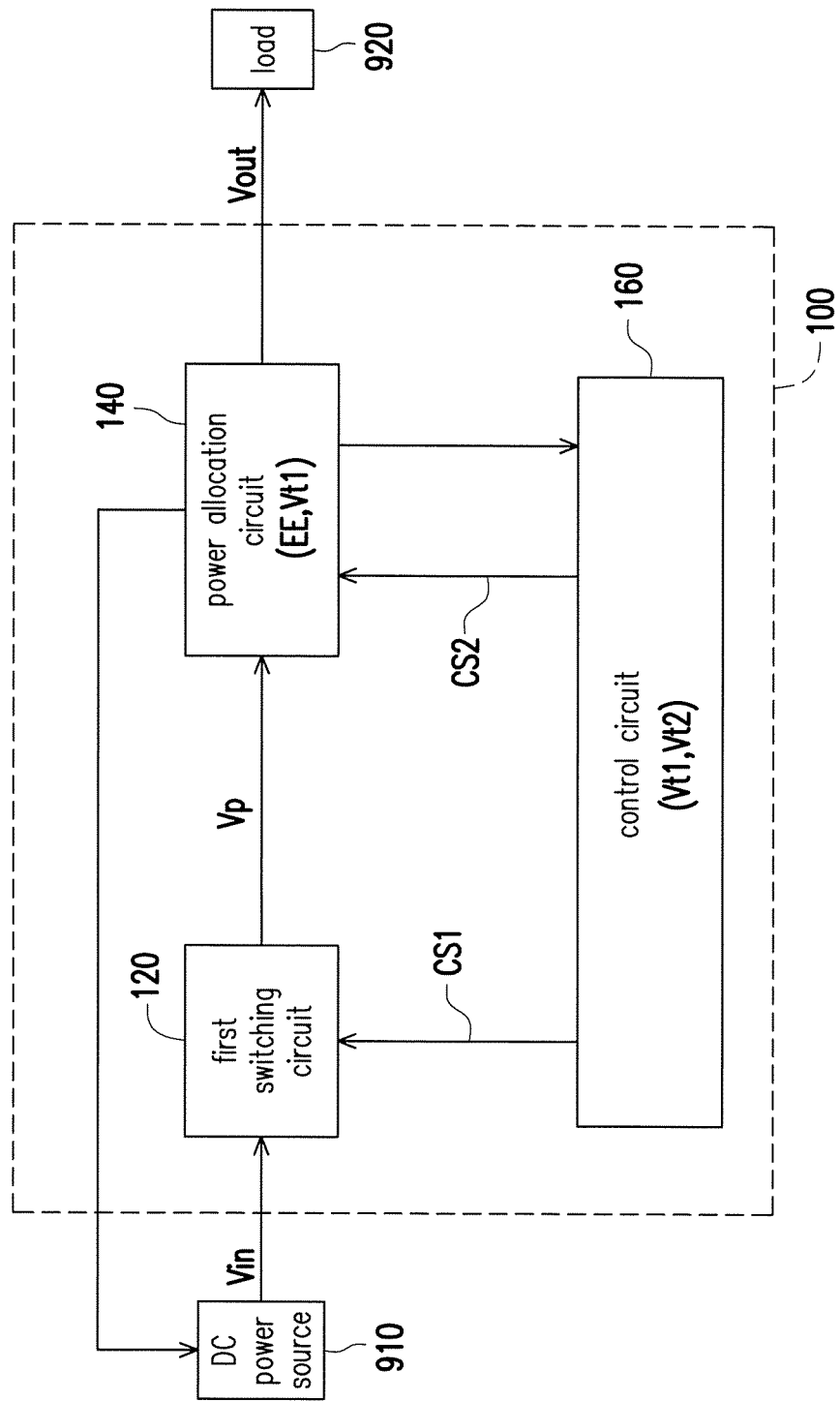
FIG. 1 is a circuit block diagram of DC-to-DC converter according to an embodiment of the invention.

In order to make the invention more comprehensible, several embodiments of the invention are introduced herein to describe the invention. Moreover, where possible, elements/components with the same reference numerals are used to represent the same or similar parts in the drawings and embodiments.

Referring to FIG. 1, FIG. 1 is a circuit block diagram of a DC-to-DC converter according to an embodiment of the invention. A DC-to-DC converter 100 may be a boost or a buck DC-to-DC converter depending on actual application or design requirement. The DC-to-DC converter 100 is coupled between a DC power source 910 and a load 920. The DC-to-DC converter 100 may include a first switching circuit 120, a power allocation circuit 140 and a control circuit 160, which should not be construed as a limitation to the invention. In other embodiments of the invention, the control circuit 160 may not be included in the DC-to-DC converter 100 but serves as a control chip that is independent of the DC-to-DC converter 100.

As shown in FIG. 1, the first switching circuit 120 is coupled to the DC power source 910 to receive a DC input voltage Vin and controlled by a first control signal CS1 to perform switching operation, thereby generating a pulse voltage Vp. The power allocation circuit 140 is coupled to the DC power source 910 and the first switching circuit 120 to receive the pulse voltage Vp and store electrical energy EE accordingly. The power allocation circuit 140 is controlled by a second control signal CS2 to convert the electrical energy EE into the DC output voltage Vout and provide the DC output voltage Vout to the load 920, or controlled by the second control signal CS2 to recuperate the electrical energy EE to the DC power source 910.

In addition, the control circuit 160 is coupled to the first switching circuit 120 and the power allocation circuit 140. In an embodiment of the invention, the control circuit 160 is configured to detect the DC output voltage Vout. When the DC output voltage Vout is greater than a first threshold voltage Vt1, the control circuit 160 may generate the first control signal CS1 to turn off the first switching circuit 120, and may generate the second control signal CS2 to turn off a power transmitting path between the power allocation circuit 140 and the load 920 so as to stop converting the electrical energy EE into the DC output voltage Vout and to recuperate the electrical energy EE to the DC power source 910, thereby suppressing the DC output voltage Vout to be lower than or equal to the first threshold voltage Vt1.

When the power allocation circuit 140 stops converting the electrical energy EE into the DC output voltage Vout, on the basis that the DC output voltage Vout is still continually provided to the load 920, the DC output voltage Vout is decreased accordingly. In order to avoid that the DC output voltage Vout becomes over-low suddenly and causes no power to be provided to the load 920, the power allocation circuit 140 starts to convert the electrical energy EE into the DC output voltage Vout when the DC output voltage Vout is lower than or equal to the first threshold voltage Vt1.

Specifically, when the DC output voltage Vout is lower than or equal to the first threshold voltage Vt1 but greater than a second threshold voltage Vt2, the control circuit 160 may generate the first control signal CS1 to maintain the first switching circuit 120 to be in an off-state, and the control circuit 160 may generate the second control signal CS2 to control on and off of the power transmitting path between the power allocation circuit 140 and the load 920 so as to convert the electrical energy EE into the DC output voltage Vout or recuperate the electrical energy EE to the DC power source 910, wherein the first threshold voltage Vt1 is greater than the second threshold voltage Vt2.

When the DC output voltage Vout is lower than or equal to the second threshold voltage Vt2, the control circuit 160 may generate the first control signal CS1 to control on and off of the first switching circuit 120, and the control circuit 160 generates the second control signal CS2 to turn on the power transmitting path between the power allocation circuit 140 and the load 920. At this time point, the power allocation circuit 140 stops recuperating the electrical energy EE to the DC power source 910, and the power allocation circuit 140 stores the electrical energy EE according to a pulse voltage Vp from the first switching circuit 120, converts the electrical energy EE into the DC output voltage Vout and maintains the DC output voltage Vout to be at the second threshold voltage Vt2.

In an embodiment of the invention, the first switching circuit 120 may be a hard switching circuit or a resonant soft switching circuit or a quasi resonant soft switching circuit, which should not be construed as a limitation to the invention.

In an embodiment of the invention, the control circuit 160 may be a hardware, a firmware or software or a machine executable program code that is stored in a memory to be loaded and executed by a microprocessor or a microcontroller. If being implemented as hardware, then the control circuit 160 may be implemented by a single integrated circuit chip, and may also be implemented by a plurality of circuit chips, which should not be construed as a limitation to the invention. The plurality of circuit chips or the single integrated circuit chip may be realized by an application-specific integrated circuit (ASIC) or a field programmable gate array (FPGA). The memory may be, for example, a random access memory, a read-only memory or a flash memory and so on.

Figure 2:
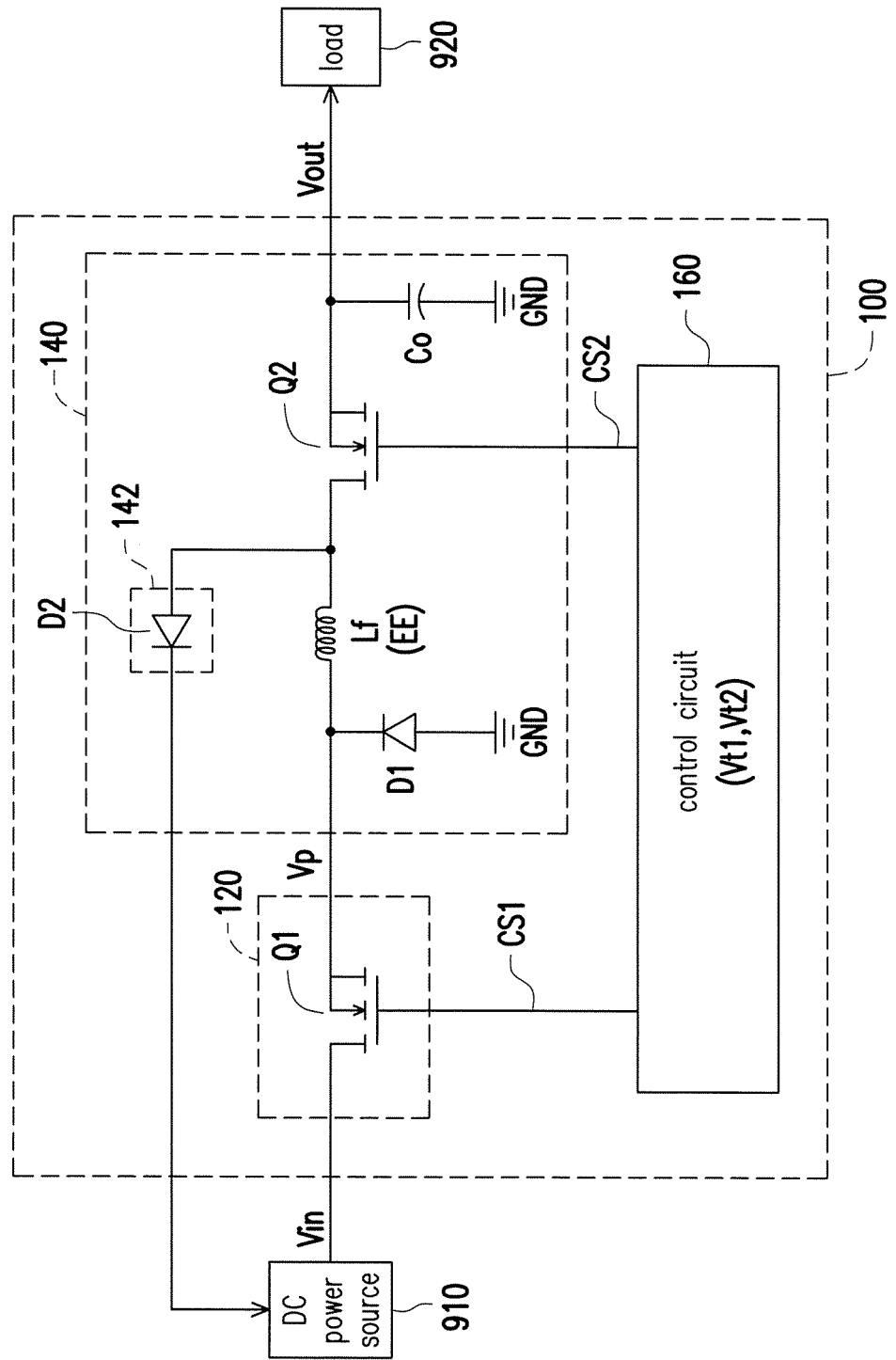
FIG. 2 is a schematic diagram of a circuit structure of the DC-to-DC converter in FIG. 1 according to an embodiment of the invention.

Referring to FIG. 2, FIG. 2 is a schematic diagram of a circuit structure of the DC-to-DC converter in FIG. 1 according to an embodiment of the invention. As shown in FIG. 2, the first switching circuit 120 is a hard switching circuit, wherein the first switching circuit 120 includes a power switch Q1. A first end of the power switch Q1 is coupled to the DC power source 910 to receive the DC input voltage Vin. A control end of the power switch Q1 receives the first control signal CS1, and the second end of the power switch Q1 may output the pulse voltage Vp.

The power allocation circuit 140 includes an inductor Lf, a freewheeling diode D1, a bypass circuit 142, a power switch Q2 and an output capacitor Co. The first end of the inductor Lf is coupled to the first switching circuit 120 to receive the pulse voltage Vp and store electrical energy EE. A cathode end of the freewheeling diode D1 is coupled to the first end of the inductor Lf, and an anode end of the freewheeling diode D1 is coupled to a ground end GND. The bypass circuit 142 is coupled between the DC power source 910 and the second end of the inductor Lf. The bypass circuit 142 may be turned on when the DC output voltage Vout is greater than or equal to the first threshold voltage Vt1, so as to recuperate the electrical energy EE to the DC power source 910. The first end of the power switch Q2 is coupled to the second end of the inductor Lf, and the control end of the power switch Q2 receives the second control signal CS2. The first end of the output capacitor Co is coupled to the second end of the power switch Q2 to generate the DC output voltage Vout, and the second end of the output capacitor Co is coupled to the ground end GND.

In an embodiment of the invention, the bypass circuit 142 may include a power diode D2, wherein a cathode end of the power diode D2 is coupled to the DC power source 910, and an anode end of the power diode D2 is coupled to the second end of the inductor Lf, which should not be construed as a limitation to the invention. In another embodiment of the invention, the designer may use a power transistor to substitute for the power diode D2.

In normal operation, the power switch Q2 is in an on-state, and the power diode D2 is in an off-state, and control circuit 160 may generate the first control signal CS1 according to a voltage value of the DC output voltage Vout or the power requirement of the load 920 so as to control on and off of the power switch Q1, thereby determining whether the inductor LF is in an energy-storage state or an energy-releasing state. When the power switch Q1 is in the on-state, the inductor LF is connected between the DC power source 910 and the load 920; at this time, the inductor Lf stores electrical energy EE and transmits power to the output capacitor Co and the load 920. When the power switch Q1 is in the off-state, the inductor Lf performs freewheeling operation via the freewheeling diode D1 so as to release the stored electrical energy EE to the output capacitor Co and the load 920. It can be understood that, in normal operation, the power allocation circuit 140 is regarded as a low-pass filter which can filter high frequency signal of the pulse voltage Vp so as to output stable DC output voltage Vout to the load 920. At this time, the DC output voltage Vout may be, for example, maintained at the second threshold voltage Vt2.

When the load 920 is changed dramatically, for example, the state of the load 920 is changed from a heavy load state to a light load state or a no load state, the DC output voltage Vout is rising. When the DC output voltage Vout is rising to be greater than the second threshold voltage Vt2 but still lower than or equal to the first threshold voltage Vt1, the control circuit 160 turns off the power switch Q1 and control on and off of the power switch Q2 so as to release the stored electrical energy EE to the output capacitor Co and the load 920 when the power switch Q2 is turned on, or recuperate the electrical energy EE to the DC power source 910 via the power diode D2 when the power switch Q2 is turned off. Once the DC output voltage Vout is rising continuously to be greater than the first threshold voltage Vt1, the power switches Q1 and Q2 are maintained to be the off-state such that the electrical energy EE stored in the inductor Lf is recuperated to the DC power source 910 via the power diode D2, thereby suppressing the DC output voltage Vout to be lower than or equal to the first threshold voltage Vt1. The Table 1 below shows the magnitude of the DC output voltage Vout and the state of power switches Q1 and Q2.

TABLE 1

| DC output voltage Vout | Power switch Q1 | Power switch Q2 |
|---|---|---|
| Vo > Vt1 | Off-state | Off-state |
| Vt1 ≥ Vo > Vt2 | Off-state | switched between on-state and off-state |
| Vt2 ≥ Vo | switched between on-state and off-state | On-state |

It can be understood that, with the electrical energy recuperating mechanism of power allocation circuit 140, the voltage value of the DC output voltage Vout can be effectively suppressed when the load 920 is changed dramatically, for example, so as to prevent the over-high DC output voltage Vout from causing damage to the element inside the DC-to-DC converter 200 or the load 920 in the light load state.

Figure 3:
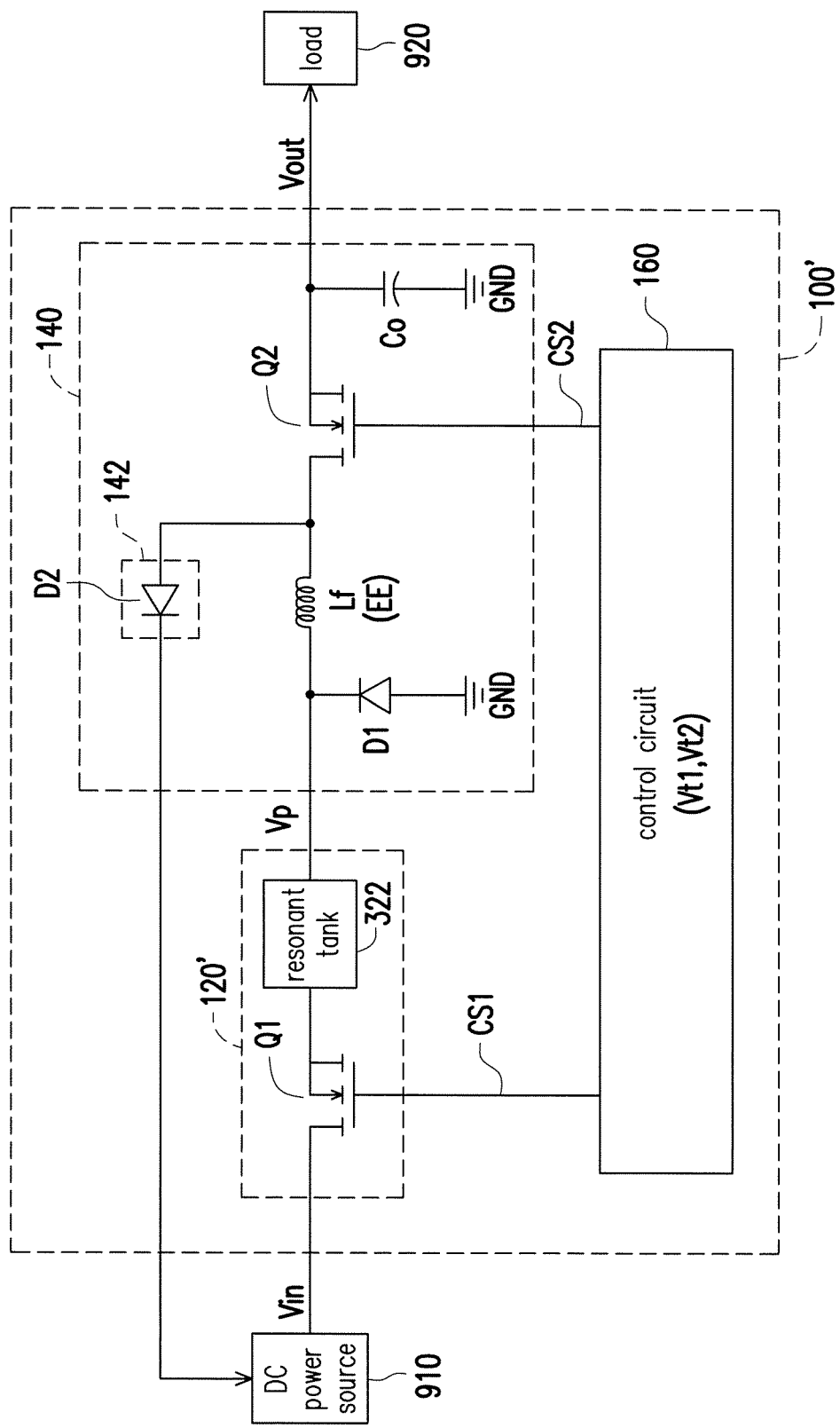
FIG. 3 is a schematic diagram of a circuit structure of the DC-to-DC converter in FIG. 1 according to another embodiment of the invention.

Referring to FIG. 3, FIG. 3 is a schematic diagram of a circuit structure of the DC-to-DC converter in FIG. 1 according to another embodiment of the invention. The power allocation circuit 140 and control circuit 160 in FIG. 3 are respectively similar to the power allocation circuit 140 and the control circuit 160 in FIG. 2; therefore, please refer to FIG. 2 for related descriptions concerning the implementation and detailed operation thereof, and no further descriptions are incorporated herein. As compared with the first switching circuit 120 which is a hard switching circuit in FIG. 2, a first switching circuit 120' in FIG. 3 may be a resonant soft switching circuit or a quasi resonant soft switching circuit. The first switching circuit 120' has the advantage of zero-current switching (ZCS) or zero-voltage switching (ZVS), which may reduce switching loss and improve overall converting efficiency while reducing electromagnetic interference (EMI).

As shown in FIG. 3, the first switching circuit 120' may include the power switch Q1 and a resonant tank 322. The first end of the power switch Q1 is coupled to the DC power source 910 to receive the DC input voltage Vin, and the control end of the power switch Q1 receives the first control signal CS1. The resonant tank 322 is coupled between the second end of the power switch Q1 and the power allocation circuit 140 to generate resonance and output pulse voltage Vp.

Figure 4:
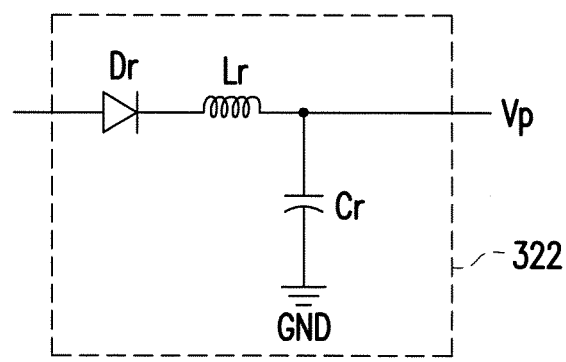
FIG. 4 is a schematic diagram of a circuit structure of a resonant tank in FIG. 3 according to an embodiment of the invention.

Referring to FIG. 3 and FIG. 4, FIG. 4 is a schematic diagram of a circuit structure of a resonant tank in FIG. 3 according to an embodiment of the invention. The resonant tank 322 may include a diode Dr, a resonant inductor Lr and a resonant capacitor Cr, which should not be construed as a limitation to the invention. An anode end of the diode Dr is coupled to the second end of the power switch Q1, and the cathode end of the diode Dr is coupled to the first end of the resonant inductor Lr. The second end of the resonant inductor Lr is coupled to the first end of the resonant capacitor Cr and generates the pulse voltage Vp. The second end of the resonant capacitor Cr is coupled to the ground end GND. Since the operation of the resonant tank 322 is known to persons skilled in the art, no further descriptions are incorporated herein.

In another embodiment of the invention, the diode Dr in the resonant tank 322 in FIG. 4 may be omitted, and the first end of the resonant inductor Lr is coupled to the second end of the power switch Q1. In other embodiments of the invention, the resonant tank 322 in FIG. 3 may also be realized by other known resonant tank circuit.

Figure 5:
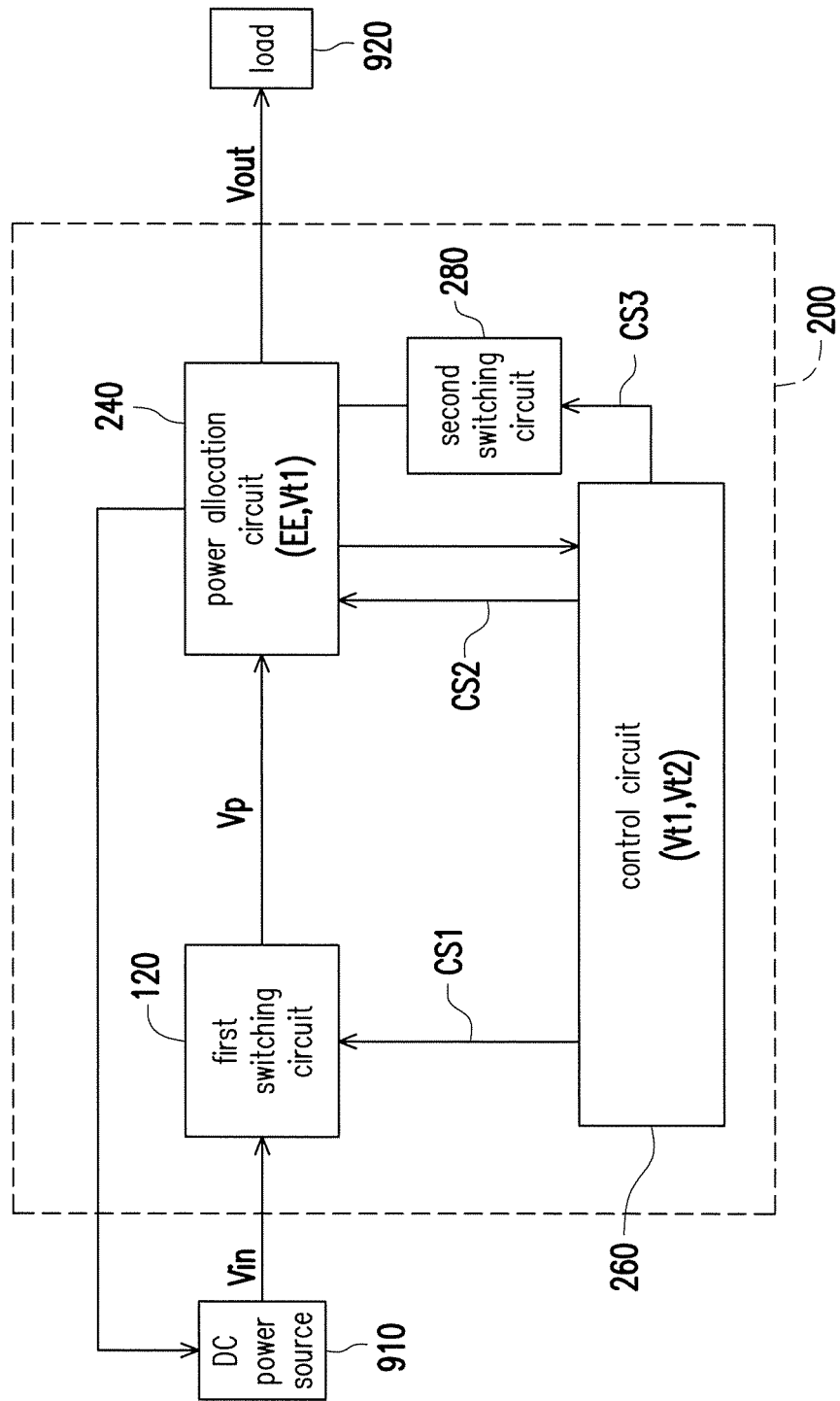
FIG. 5 is a circuit block diagram of a DC-to-DC converter according to an embodiment of the invention.

Referring to FIG. 5, FIG. 5 is a schematic circuit block diagram of a DC-to-DC converter according to an embodiment of the invention. The DC-to-DC converter 200 is a buck-boost DC-to-DC converter. The DC-to-DC converter 200 is coupled between the DC power source 910 and the load 920. The DC-to-DC converter 200 may include the first switching circuit 120, a power allocation circuit 240, a second switching circuit 280 and a control circuit 260, which should not be construed as a limitation to the invention. In other embodiment of the invention, the control circuit 260 may not be included in the DC-to-DC converter 200 but servers as a control chip that is independent of the DC-to-DC converter 200.

As shown in FIG. 5, the first switching circuit 120 is coupled to the DC power source 910 to receive the DC input voltage Vin and controlled by the first control signal CS1 to perform switching operation, thereby generating the pulse voltage Vp. The power allocation circuit 240 is coupled to the DC power source 910 and the first switching circuit 120 to receive the pulse voltage Vp and store the electrical energy EE. The power allocation circuit 240 is controlled by the second control signal CS2 to convert the electrical energy EE into the DC output voltage Vout to be provided to the load 920, or controlled by the second control signal CS2 to recuperate the electrical energy EE to the DC power source 910. The second switching circuit 280 is coupled to the power allocation circuit 240 and controlled by a third control signal CS3 to boost the DC output voltage Vout, such that the DC output voltage Vout is greater than the DC output voltage Vin.

Specifically, when the first switching circuit 120 is in the on-state and the second switching circuit 280 is controlled by the third control signal CS3 to perform switching operation, the DC-to-DC converter 200 is operated in the boost mode, such that the DC output voltage Vout is greater than the DC input voltage Vin. On the contrary, when the second switching circuit 280 is in the off-state and the first switching circuit 120 is controlled by the first control signal CS1 to perform switching operation, the DC-to-DC converter 200 is operated in the buck mode, such that the DC output voltage Vout is lower than the DC output voltage Vin.

In addition, the control circuit 260 is coupled to the first switching circuit 120, the second switching circuit 280 and the power allocation circuit 240. In an embodiment of the invention, the control circuit 260 is configured to detect the DC output voltage Vout. When the DC output voltage Vout is greater than the first threshold voltage Vt1, the control circuit 260 may generate the first control signal CS1 and the third control signal CS3 to respectively turn off the first switching circuit 120 and the second switching circuit 280, and may generate the second control signal CS2 to turn on the power recuperating path between the power allocation circuit 240 and the DC power source 910 so as to stop converting the electrical energy EE into the DC output voltage Vout and to recuperate the electrical energy EE to the DC power source 910, thereby suppressing the DC output voltage Vout to be lower than or equal to the first threshold voltage Vt1.

In the condition that the power allocation circuit 240 stops converting the electrical energy EE into the DC output voltage Vout, on the basis that the DC output voltage Vout is still supplied to the load 920 continuously, the DC output voltage Vout is decreased. In order to avoid that the DC output voltage Vout becomes over-low suddenly and causes no power is supplied to the load 920, the power allocation circuit 240 starts to convert the electrical energy EE into the DC output voltage Vout when the DC output voltage Vout is lower than or equal to the first threshold voltage Vt1.

Specifically, when the DC output voltage Vout is lower than or equal to the first threshold voltage Vt1 but greater than the second threshold voltage Vt2, the control circuit 260 may generate the first control signal CS1 to maintain the first switching circuit 120 to be in the off-state, the control circuit 260 may generate the third control signal CS3 to maintain the second switching circuit 280 to be in the off-state, and the control circuit 260 may generate the second control signal CS2 to control on and off of the power allocation circuit 240 so as to convert the electrical energy EE into the DC output voltage Vout or recuperate the electrical energy EE to the DC power source 910, wherein the first threshold voltage Vt1 is greater than the second threshold voltage Vt2.

When the DC output voltage Vout is lower than or equal to the second threshold voltage Vt2, the control circuit 260 may generate the first control signal CS1 to turn on the first switching circuit 120, the control circuit 260 may generate the second control signal CS2 to turn off the power recuperating path between the power allocation circuit 240 and the DC power source 910, and the control circuit 260 may generate the third control signal CS3 to control on and off of the second switching circuit 280, such that the DC-to-DC converter 200 is operated in the boost mode and the DC output voltage Vout is maintained at the second threshold voltage Vt2. At this time, the power allocation circuit 240 stops recuperating the electrical energy EE to the DC power source 910.

In addition, the implementation of the first switching circuit 120 and the control circuit 260 in FIG. 5 are respectively similar to the first switching circuit 120 and the control circuit 160 in FIG. 1; therefore, please refer to related description of FIG. 1 for reference, and no further descriptions are incorporated herein.

Figure 6:
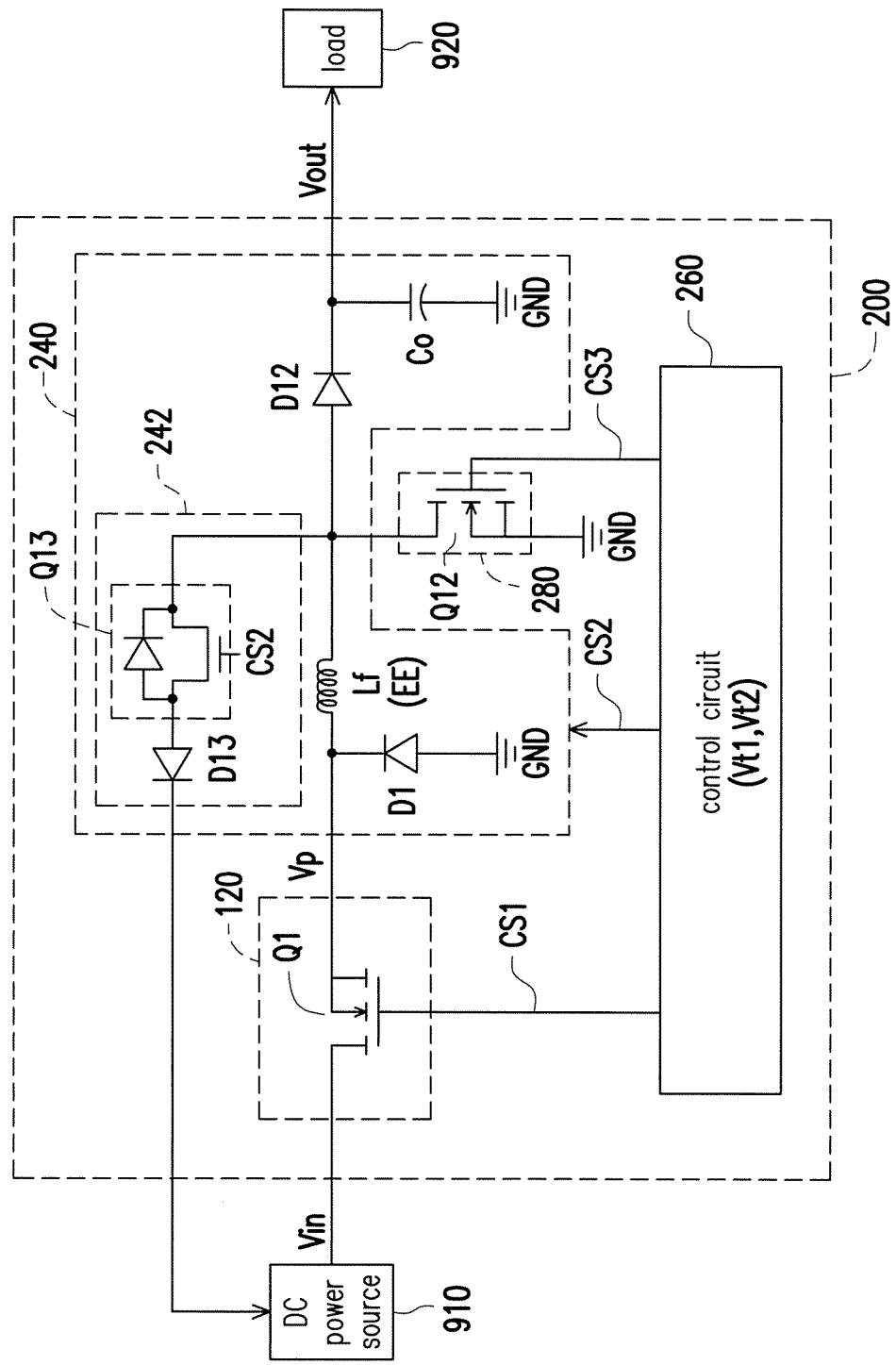
FIG. 6 is a schematic diagram of a circuit structure of the DC-to-DC converter in FIG. 5 according to an embodiment of the invention.

Referring to FIG. 6, FIG. 6 is a schematic diagram of a circuit structure of the DC-to-DC converter in FIG. 5 according to an embodiment of the invention. As shown in FIG. 6, the first switching circuit 120 includes the power switch Q1. The first end of the power switch Q1 is coupled to the DC power source 910 to receive the DC input voltage Vin. The control end of the power switch Q1 receives the first control signal CS1, and the second end of the power switch Q1 may output the pulse voltage Vp.

The power allocation circuit 240 may include an inductor Lf, a freewheeling diode D1, a bypass circuit 242, a first diode D2 and the output capacitor Co. The first end of the inductor Lf is coupled to the first switching circuit 120 to receive the pulse voltage Vp and store electrical energy EE. A cathode end of the freewheeling diode D1 is coupled to the first end of the inductor Lf, and an anode end of the freewheeling diode D1 is coupled to the ground end GND. The bypass circuit 242 is coupled between the DC power source 910 and the second end of the inductor Lf. The bypass circuit 242 may be turned on to recuperate the electrical emery EE to the DC power source 910 when the DC output voltage Vout is greater than or equal to the first threshold voltage Vt1. An anode end of the first diode D12 is coupled to the second end of the inductor Lf. The first end of the output capacitor Co is coupled to a cathode end of the first diode D12 to generate the DC output voltage Vout, and the second end of the output capacitor Co is coupled to the ground end GND.

In an embodiment of the invention, the bypass circuit 242 includes a power diode D13 and a bypass switch Q13. A cathode end of the power diode D13 is coupled to the DC power source 910. The first end of the bypass switch Q13 is coupled to the second end of the inductor Lf, a control end of the bypass switch Q13 receives the second control signal CS2, and a second end of the bypass switch Q13 is coupled to the anode end of the power diode D13. A parasitic diode exists between the first end and the second end of the bypass switch Q13, wherein a cathode end of the parasitic diode is the first end of the bypass switch Q13, and an anode end of the parasitic diode is the second end of the bypass switch Q13.

In an embodiment of the invention, the second switching circuit 280 includes a power switch Q12. A first end of the power switch Q12 is coupled to the second end of the inductor Lf, a control end of the power switch Q12 receives the third control signal CS3, and the second end of the power switch Q12 is coupled to the ground end GND.

In normal operation, the bypass circuit Q13 is in the off-state, and the power diode D2 is in the off-state. In addition, in normal operation, if the DC-to-DC converter 200 is set to be in the buck mode, then the power switch Q12 is set to be in the off-state, and the control circuit 260 generates the first control signal CS1 to control on and off of the power switch Q1 according to the voltage value of the DC output voltage Vout or the power requirement of the load 920. On the contrary, in normal operation, if the DC-to-DC converter 200 is set to be in the boost mode, then the power switch Q1 is set to be in the on-state, and the control circuit 260 generates the third control signal CS3 to control on and off of the power switch Q12 according to the voltage value of the DC output voltage Vout or the power requirement of the load 920. Since the buck operation and boost operation of the DC-to-DC converter 200 are known to persons skilled in the art, no further descriptions are incorporated herein. It can be understood that, in normal operation, the power allocation circuit 240 is regarded as a low-pass filter, which can output stable DC output voltage Vout to the load 920. At this time, the DC output voltage Vout may be, for example, maintained at the second threshold voltage Vt2.

When the load 920 is changed dramatically, for example, the state of the load 920 is changed from the heavy load state into the light load state or a no load state, the DC out voltage Vout is rising. When the DC output voltage Vout is rising to be greater than the second threshold voltage Vt2 but still lower than or equal to the first threshold voltage Vt1, the control circuit 260 turns off the power switching Q1 and the power switching Q12, and the control circuit 260 controls on and off of the bypass switch Q13, so as to release the stored electrical energy EE to the output capacitor Co and the load 920 via the freewheeling diode D1 and the first diode D12 when the bypass switch Q13 is turned off, or recuperate the electrical energy EE to the DC power source 910 when the bypass switch Q13 is turned on. Once the DC output voltage Vout is rising to be greater than the first threshold voltage Vt1, the power switches Q1 and Q12 are both maintained in the off-state, and the bypass switch Q13 is maintained in the on-state, such that the electrical energy EE stored in the inductor Lf can be recuperated to the DC power source 910 via the freewheeling diode D1, the bypass switch Q13 and the power diode D13. At this time, the first diode D12 is in the off-state, thereby suppressing the DC output voltage Vout to be lower than or equal to the first threshold voltage Vt1. The following Table 2 shows the magnitude of the output voltage Vout as well as the states of the power switches Q1 and Q12 and the bypass switch Q13 when the DC-to-DC converter 200 is operated in the boost mode.

TABLE 2

| DC output voltage Vout | Power switch Q1 | Power switch Q12 | Bypass switch Q13 |
| --- | --- | --- | --- |
| Vo > Vt1 | Off-state | Off-state | On-state |
| Vt1 ≥ Vo > Vt2 | Off-state | Off-state | switched between on-state and off-state |
| Vt2 ≥ Vo | On-state | switched between on-state and off-state | Off-state |

Figure 7:
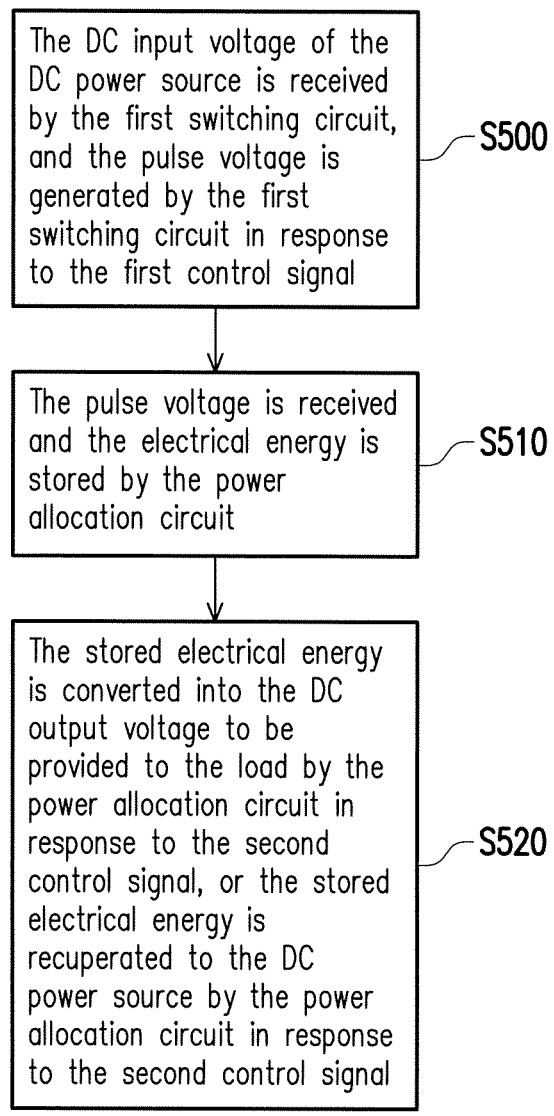
FIG. 7 is a flowchart diagram illustrating a power allocation method of a DC-to-DC converter according to an embodiment of the invention.

Referring to FIG. 1 and FIG. 7, FIG. 7 is a flowchart diagram illustrating a power allocation method of a DC-to-DC converter according to an embodiment of the invention; the method includes the following steps. First of all, in step S500, the DC input voltage Vin of the DC power source 910 is received by the first switching circuit 120, and the pulse voltage Vp is generated by the first switching circuit 120 in response to the first control signal CS1. Next, in step S510, the pulse voltage Vp is received and the electrical energy EE is stored by the power allocation circuit 140. Thereafter, in step S520, the stored electrical energy EE is converted into the DC output voltage Vout to be provided to the load 920 by the power allocation circuit 140 in response to the second control signal CS2, or the stored electrical energy EE is recuperated to the DC power source 910 by the power allocation circuit 140 in response to the second control signal CS2.

Furthermore, sufficient teaching, suggestions and implementations of the details regarding the power allocation method of the DC-to-DC converter in the embodiment of the invention may be derived from the embodiments of FIG. 1 to FIG. 6 and thus no further descriptions are incorporated herein.

In summary of the above, the DC-to-DC converter and the power allocation method thereof in the embodiment of the invention can activate the electrical energy recuperating mechanism when the load is changed or removed, such that the stored electrical energy could be recuperated to the DC power source. In this manner, the voltage value of the DC output voltage can be suppressed effectively so as to avoid that the over-high DC output voltage causes damage to the element inside the DC-to-DC converter or the load. Moreover, the DC-to-DC converter in the embodiment of the invention may also have the advantage of zero-current switching or zero-voltage switching in the embodiment provided with resonant tank, thereby effectively reducing switching loss, improving overall converting efficiency and reducing electromagnetic interference.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A DC-to-DC converter, coupled between a DC power source and a load, comprising:
    a first switching circuit, coupled to the DC power source to receive a DC input voltage, and controlled by a first control signal to generate a pulse voltage; and
    a power allocation circuit, coupled to the DC power source and the first switching circuit, to receive the pulse voltage and store an electrical energy accordingly, wherein the power allocation circuit is controlled by a second control signal to convert the electrical energy into a DC output voltage to be provided to the load, or controlled by the second control signal to recuperate the electrical energy to the DC power source,
    wherein when the DC output voltage is greater than a first threshold voltage, the first switching circuit is turned off by the first control signal, and the power allocation circuit stops converting the electrical energy into the DC output voltage and recuperates the electrical energy to the DC power source, thereby suppressing the DC output voltage to be lower than or equal to the first threshold voltage.

2. The DC-to-DC converter according to claim 1, further comprising:
    a control circuit, coupled to the first switching circuit and the power allocation circuit for detecting the DC output voltage, wherein:
    when the DC output voltage is greater than the first threshold voltage, the control circuit generates the first control signal to turn off the first switching circuit, and generates the second control signal to turn off a power transmitting path between the power allocation circuit and the load.

3. The DC-to-DC converter according to claim 2, wherein:
    when the DC output voltage is lower than or equal to the first threshold voltage but greater than a second threshold voltage, the control circuit generates the first control signal to turn off the first switching circuit, and the control circuit generates the second control signal to control on and off of the power transmitting path between the power allocation circuit and the load, so as to convert the electrical energy into the DC output voltage or recuperate the electrical energy to the DC power source; and
    when the DC output voltage is lower than or equal to the second threshold voltage, the control circuit generates the first control signal to control on and off of the first switching circuit, and the control circuit generates the second control signal to turn on the power transmitting path between the power allocation circuit and the load so as to stop recuperating the electrical energy to the DC power source and to convert the electrical energy into the DC output voltage.

4. The DC-to-DC converter according to claim 1, wherein the power allocation circuit comprises:
    an inductor, a first end of the inductor being coupled to the first switching circuit for receiving the pulse voltage to store the electrical energy;
    a freewheeling diode, a cathode end of the freewheeling diode being coupled to the first end of the inductor, and an anode end of the freewheeling diode being coupled to a ground end;
    a bypass circuit, coupled between the DC power source and a second end of the inductor, wherein the bypass circuit is turned on to recuperate the electrical energy to the DC power source when the DC output voltage is greater than or equal to the first threshold voltage;
    a power switch, a first end of the power switch being coupled to the second end of the inductor, and a control end of the power switch receiving the second control signal; and
    an output capacitor, a first end of the output capacitor being coupled to a second end of the power switch to generate the DC output voltage, and a second end of the output capacitor being coupled to the ground end.

5. The DC-to-DC converter according to claim 4, wherein the bypass circuit comprises:
    a power diode, a cathode end of the power diode being coupled to the DC power source, and an anode end of the power diode being coupled to the second end of the inductor.

6. The DC-to-DC converter according to claim 1, wherein the first switching circuit is a hard switching circuit or a resonant soft switching circuit or a quasi resonant soft switching circuit.

7. The DC-to-DC converter according to claim 1, wherein the first switching circuit comprises:
    a power switch, a first end of the power switch being coupled to the DC power source to receive the DC input voltage, a control end of the power switch receiving the first control signal, and a second end of the power switch outputting the pulse voltage.

8. The DC-to-DC converter according to claim 1, wherein the first switching circuit comprises:
    a power switch, a first end of the power switch being coupled to the DC power source to receive the DC input voltage, and a control end of the power switch receiving the first control signal; and
    a resonant tank, coupled between a second end of the power switch and the power allocation circuit to generate resonance and output the pulse voltage.

9. The DC-to-DC converter according to claim 1, further comprising:
    a second switching circuit, coupled to the power allocation circuit and controlled by a third control signal to boost the DC output voltage such that the DC output voltage is greater than the DC input voltage; and a control circuit, coupled to the first switching circuit, the power allocation circuit and the second switching circuit for detecting the DC output voltage, wherein:

when the DC output voltage is greater than the first threshold voltage, the control circuit generates the first control signal to turn off the first switching circuit, the control circuit generates the third control signal to turn off the second switching circuit, and the control circuit generates the second control signal to turn on a power recuperating path between the power allocation circuit and the DC power source.

10. The DC-to-DC converter according to claim 9, wherein:

when the DC output voltage is lower than or equal to the first threshold voltage but greater than a second threshold voltage, the control circuit generates the first control signal to turn off the first switching circuit, the control circuit generates the third control signal to turn off the second switching circuit, and the control circuit generates the second control signal to control on and off of the power allocation circuit, so as to convert the electrical energy into the DC output voltage or recuperate the electrical energy to the DC power source; and when the DC output voltage is lower than or equal to the second threshold voltage, the control circuit generates the first control signal to turn on the first switching circuit, the control circuit generates the second control signal to turn off the power recuperating path between the power allocation circuit and the DC power source, and the control circuit generates the third control signal to control on and off of the second switching circuit so as to stop recuperating the electrical energy to the DC power source and to convert the electrical energy into the DC output voltage, such that the DC output voltage is maintained at the second threshold voltage.

11. The DC-to-DC converter according to claim 10, wherein the power allocation circuit comprises:

an inductor, a first end of the inductor being coupled to the first switching circuit for receiving the pulse voltage to store the electrical energy;

a freewheeling diode, a cathode end of the freewheeling diode is coupled to the first end of the inductor, and an anode end of the freewheeling diode is coupled to a ground end;

a bypass circuit, coupled between the DC power source and a second end of the inductor, wherein the bypass circuit is turned on to recuperate the electrical energy to the DC power source when the DC output voltage is greater than or equal to the first threshold voltage;

a first diode, an anode end of the first diode being coupled to the second end of the inductor; and an output capacitor, a first end of the output capacitor being coupled to a cathode end of the first diode to generate the DC output voltage, and a second end of the output capacitor being coupled to the ground end.

12. The DC-to-DC converter according to claim 11, wherein the bypass circuit comprises:

a power diode, a cathode end of the power diode being coupled to the DC power source; and a bypass switch, a first end of the bypass switch being coupled to the second end of the inductor, a control end of the bypass switch receiving the second control signal, and a second end of the bypass switch being coupled to an anode end of the power diode.

13. The DC-to-DC converter according to claim 11, wherein the second switching circuit comprises:

a power switch, a first end of the power switch being coupled to the second end of the inductor, a control end of the power switch receiving the third control signal, and a second end of the power switch being coupled to the ground end.

14. A power allocation method, for a DC-to-DC converter, wherein the power allocation method comprises:

receiving a DC input voltage of a DC power source by a first switching circuit of the DC-to-DC converter, and generating a pulse voltage by the first switching circuit in response to a first control signal;

receiving the pulse voltage and storing an electrical energy by a power allocation circuit of the DC-to-DC converter;

converting, by the power allocation circuit, the stored electrical energy into a DC output voltage to be provided to a load in response to a second control signal, or recuperating the stored electrical energy to the DC power source by the power allocation circuit in response to the second control signal;

determining whether the DC output voltage is greater than a first threshold voltage to acquire a first determination result; and if the first determination result is affirmative, turning off the first switching circuit by the first control signal, stopping converting the electrical energy into the DC output voltage, and recuperating the electrical energy to the DC power source, thereby suppressing the DC output voltage to be lower than or equal to the first threshold voltage.

15. The power allocation method according to claim 14, further comprising:

if the first determination result is affirmative, performing the following steps by a control circuit of the DC-to-DC converter;

generating the first control signal to turn off the first switching circuit; and generating the second control signal to turn off a power transmitting path between the power allocation circuit and the load.

16. The power allocation method according to claim 15, further comprising:

determining whether the DC output voltage is lower than or equal to the first threshold voltage and greater than a second threshold voltage to acquire a second determination result;

if the second determination result is affirmative, performing the following steps by the control circuit:

generating the first control signal to turn off the first switching circuit; and generating the second control signal to control the power allocation circuit to convert the electrical energy into the DC output voltage or to recuperate the electrical energy to the DC power source; and when the DC output voltage is lower than or equal to the second threshold voltage, generating the first control signal by the control circuit to control on and off of the first switching circuit, generating the second control signal by the control circuit to turn on the power transmitting path between the power allocation circuit and the load to stop recuperating the electrical energy to the DC power source and to convert the electrical energy into the DC output voltage.

17. The power allocation method according to claim 14, further comprising:

boosting the DC output voltage by a second switching circuit such that the DC output voltage is greater than the DC input voltage;

if the first determination result is affirmative, performing the following steps by a control circuit of the DC-to-DC converter:

generating the first control signal to turn off the first switching circuit;

generating a third control signal to turn off the second switching circuit; and generating the second control signal to turn on a power recuperating path between the power allocation circuit and the DC power source.

18. The power allocation method according to claim 17, further comprising:

determining whether the DC output voltage is lower than or equal to the first threshold voltage and greater than a second threshold voltage to acquire a second determination result;

if the second determination result is affirmative, performing the following steps by the control circuit;

generating the first control signal to turn off the first switching circuit;

generating the third control signal to turn off the second switching circuit; and generating the second control signal to control on and off of the power allocation circuit so as to convert the electrical energy into the DC output voltage or recuperate the electrical energy to the DC power source; and when the DC output voltage is lower than or equal to the second threshold voltage, generating the first control signal by the control circuit to turn on the first switching circuit, generating the second control signal by the control circuit to turn off the power recuperating path between the power allocation circuit and the DC power source, and generating the third control signal by the control circuit to control on and off of the second switching circuit so as to stop recuperating the electrical energy to the DC power source and to convert the electrical energy into the DC output voltage, such that the DC output voltage is maintained at the second threshold voltage.

* * * * *